(12) United States Patent
Zhang et al.

(10) Patent No.: US 12,495,080 B2
(45) Date of Patent: Dec. 9, 2025

(54) COMMUNICATION METHOD, SIGNALING CONTROL NETWORK ELEMENT, MEDIA CONTROL NETWORK ELEMENT AND COMMUNICATION SYSTEM

(71) Applicant: ZTE Corporation, Guangdong (CN)

(72) Inventors: Lu Zhang, Guangdong (CN); Mengxiao Wang, Guangdong (CN); Shilin Chen, Guangdong (CN); Tingxiang Shi, Guangdong (CN); Yanwei Fang, Guangdong (CN); Yongsheng Miao, Guangdong (CN); Chengnian Shen, Guangdong (CN); Rujun Li, Guangdong (CN); Jian Tang, Guangdong (CN); Jun Hong, Guangdong (CN)

(73) Assignee: ZTE Corporation, Shenzhen (CN)

( * ) Notice: Subject to any disclaimer, the term of this patent is extended or adjusted under 35 U.S.C. 154(b) by 66 days.

(21) Appl. No.: 18/427,401

(22) Filed: Jan. 30, 2024

(65) Prior Publication Data

US 2024/0244093 A1  Jul. 18, 2024

Related U.S. Application Data

(63) Continuation of application No. PCT/CN2022/091255, filed on May 6, 2022.

(30) Foreign Application Priority Data

Jul. 30, 2021 (CN) .......................... 202110868615.6

(51) Int. Cl.
*H04L 65/1069* (2022.01)
*H04L 65/1016* (2022.01)
*H04L 65/1101* (2022.01)

(52) U.S. Cl.
CPC ...... *H04L 65/1069* (2013.01); *H04L 65/1016* (2013.01); *H04L 65/1101* (2022.05)

(58) Field of Classification Search
CPC ............. H04L 65/1016; H04L 65/1069; H04L 65/1101

(Continued)

(56) References Cited

U.S. PATENT DOCUMENTS 6,678,527 B1  1/2004  Rasanen
2016/0337449 A1  11/2016  Yang et al.

(Continued)

FOREIGN PATENT DOCUMENTS

CN  101123647 A  2/2008
CN  101163150 A  4/2008

(Continued)

OTHER PUBLICATIONS

ISA, International Search Report and Written Opinion for International Application No. PCT/CN2022/091255, mailed on Aug. 3, 2022, 10 pages with English translation.

(Continued)

*Primary Examiner* — Glenford J Madamba
(74) *Attorney, Agent, or Firm* — Perkins Coie LLP

(57) ABSTRACT

A communication method, a signaling control network element, a media control network element and a communication system. The communication method comprises: acquiring a transparent transmission channel creation request; performing, according to the transparent transmission channel creation request, negotiation processing on a media control network element and a first terminal device corresponding to a first terminal identifier, so as to create a transparent transmission channel between the media control network element and the first terminal device; obtaining a first resource identifier of an application entity according to (Continued)

the transparent transmission channel creation request; and sending the first resource identifier to the media control network element, so that the media control network element determines a data transmission relationship between the transparent transmission channel and the application entity corresponding to an application identifier.

17 Claims, 13 Drawing Sheets

(58) Field of Classification Search
USPC .......................................................... 709/224
See application file for complete search history.

(56) References Cited

U.S. PATENT DOCUMENTS

2018/0041549 A1* 2/2018 Noldus ............... H04L 65/1104
2018/0316732 A1* 11/2018 Belling ................... H04L 65/65

FOREIGN PATENT DOCUMENTS

| CN | 101378383 A | 3/2009 |
| CN | 101835121 A | 9/2010 |
| CN | 102883376 A | 1/2013 |
| CN | 104717180 A | 6/2015 |
| CN | 106454785 A | 2/2017 |
| CN | 111614792 A | 9/2020 |
| CN | 112087780 A | 12/2020 |

OTHER PUBLICATIONS

European Search Report issued in EP Patent Application No. 22847931.7, Oct. 21, 2024, 12 pages.
Yoshimura et al., "Data Broadcasting System Using a Direct Broadcast Satellite in Japan," NHK Laboratories Note, NHK Technical Research Laboratories, Tokyo, Japan, No. 411, Jan. 1, 1993, XP000361028, ISSN: 0027-657X, pp. 1-18.

* cited by examiner

COMMUNICATION METHOD, SIGNALING CONTROL NETWORK ELEMENT, MEDIA CONTROL NETWORK ELEMENT AND COMMUNICATION SYSTEM

CROSS REFERENCE TO RELATED APPLICATIONS

This application is a continuation of International Patent Application No. PCT/CN2022/091255, filed on May 6, 2022, which claims priority to Chinese Patent Application No. 202110868615.6, filed on Jul. 30, 2021, the disclosures of each of which are incorporated herein by reference in their entireties.

TECHNICAL FIELD

The present disclosure relates to, but is not limited to, the field of communications, and particularly to a communication method, a signaling control network element, a media control network element and a communication system.

BACKGROUND

The IP Multimedia Subsystem (IMS) is a subsystem supporting IP multimedia services proposed by the Third Generation Partnership Project (3GPP) and represents a development direction of multimedia communication. As an application subsystem in the 4G era, IMS can well meet the communication between people in the 4G era. IMS is significantly characterized by employing a Session Initial Protocol (SIP) system, performing communications irrelevant to the access manner, and having a plurality of capabilities such as separating a control function of a plurality of multimedia services from a bearing capability, separating a call from a session, separating an application from a service, separating a service from a network, and merging a mobile network with an Internet service. However, in the conventional IMS architecture, a newly added application needs to be implemented by adding a new media line in a Session Description Protocol (SDP), which requires multiple functional entities in an IMS network to be upgraded and renovated, for example, an Session Border Controller (SBC) responsible for terminal device access/ Proxy-Call Session Control Function (P-CSCF), a Telephony Application Server (TAS) responsible for implementing a basic supplemental service, a Media Resource Function Processor (MRFP) used by the application server; IP Interconnection Border Control Function (IBCF) and Transition Gateway (TrGW) responsible for IMS interworking. This makes new applications difficult to be deployed quickly, and operators are affected in quickly releasing applications.

SUMMARY

The following is a summary of the subject matter described in detail herein. This summary is not intended to limit the scope of the claims.

Embodiments of the present disclosure relate to a communication method, a signaling control network element, a media control network element and a communication system.

In a first aspect, embodiments of the present disclosure provide a communication method, applied to a signaling control network element, the signaling control network element being communicatively connected to at least one terminal device via a CSCF, the signaling control network element being connected to a media control network element, the signaling control network element being connected to at least one application entity, the media control network element being connected to at least one application entity, the method comprising: acquiring a transparent transmission channel creation request which carries a first terminal identifier; performing, according to the transparent transmission channel creation request, negotiation processing on the media control network element and a first terminal device corresponding to the first terminal identifier, so as to create a transparent transmission channel between the media control network element and the first terminal device; obtaining a first resource identifier of the application entity according to the transparent transmission channel creation request; and sending the first resource identifier to the media control network element, so that the media control network element determines a data transmission relationship between the transparent transmission channel and the application entity corresponding to an application identifier.

In a second aspect, embodiments of the present disclosure further provide a communication method, applied to a media control network element, the media control network element being connected to a signaling control network element, the media control network element being connected to at least one application entity, the signaling control network element being communicatively connected to at least one terminal device via a CSCF, the signaling control network element being connected to at least one application entity, the method comprising: acquiring a transparent transmission channel resource request from the signaling control network element; allocating transparent transmission channel resource information for establishing a transparent transmission channel according to the transparent transmission channel resource request, and sending the transparent transmission channel resource information to the signaling control network element so as to perform coordination processing on a first terminal device via the signaling control network element, thereby creating a transparent transmission channel between the media control network element and the first terminal device; acquiring a first resource identifier from a signaling processing unit, the first resource identifier being a resource identifier of the application entity; determining a data transmission relationship between the transparent transmission channel and the application entity corresponding to the first resource identifier according to the first resource identifier.

In a third aspect, embodiments of the present disclosure further provide a signaling control network element, comprising: a memory, a processor, and a computer program stored on the memory and executable on the processor, the processor performing the communication method according to the first aspect upon executing the computer program.

In a fourth aspect, embodiments of the present disclosure further provide a media control network element, comprising: a memory, a processor and a computer program stored on the memory and executable on the processor, the processor performing the communication method according to the second aspect upon executing the computer program.

In a fifth aspect, embodiments of the present disclosure further provide a communication system, comprising the signaling control network element according to the third aspect, the media control network element according to the fourth aspect, a CSCF, at least one terminal device and at least one application entity, the signaling control network element being communicatively connected to at least one terminal device via the CSCF, the signaling control network element being connected to the media control network element, the signaling control network element being connected to at least one application entity, the media control network element being connected to at least one application entity.

In a sixth aspect, a computer-readable storage medium having stored thereon computer-executable instructions for performing the communication method of the first aspect or for performing the communication method of the second aspect.

Other features and advantages of the present disclosure will be described in the following description, and in part become apparent from the description, or may be understood by implementing the present invention. The objectives and other advantages of the present disclosure may be realized and attained by the structure particularly pointed out in the description, claims as well as the accompanying drawings.

DETAILED DESCRIPTION

Figure 1:
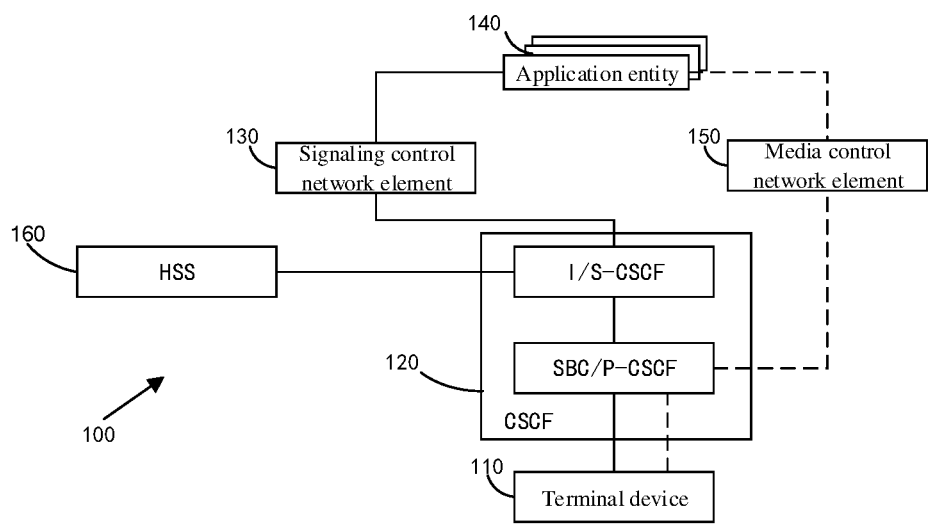
FIG. 1 is a schematic diagram of a system architecture for implementing a communication method provided by one embodiment of the present disclosure.

In order to make the objects, aspects and advantages of the present disclosure more apparent, the present disclosure will be described in more detail with reference to figures and embodiments. It should be explained that specific embodiments described herein are only intended to illustrate the present disclosure, not to limit the present disclosure.

It should be explained that although the division of functional blocks is performed in schematic diagrams of the apparatus and the logical order is shown in the flowchart, in some cases the steps shown or described may be performed with a module division different from that in the apparatus or in an order different from that shown in the flowchart. The terms "first," "second" and the like in the description, in the claims, or in the above-described figures are used for distinguishing between similar objects and not necessarily for describing a particular order or a sequential order.

The evolution of communication technology has come to the fifth generation. The mobile communication technology from the first generation to the fourth generation are all concerned with people-to-people communication. The emergence of the fifth generation of communication technology provides users with a mobile network with a higher bandwidth, a lower latency and a wider coverage, and may provide more applications such as network live broadcast, virtual reality, 4K video.

The 5G technology will face five major application scenarios in the future:

1) The ultra-high-speed scenario provides a very-fast data network access for future mobile broadband users;
2) Support large-scale population and provide high-quality mobile broadband experience for regions or occasions with high population density;
3) provide optimal experience at anytime and anywhere to ensure that users continue to enjoy high quality services in the mobile state;
4) Ultra-reliable real-time connections to ensure that new applications and user instances meet strict standards in terms of latency and reliability; and
5) The ubiquitous communication of things ensures the efficient handling of a wide variety of device communications, including machine-like devices and sensors.

The above applications put higher demands on communication systems in 5G networks.

The IMS is a subsystem supporting IP multimedia services proposed by 3GPP and represents a development direction of multimedia communication. As an application subsystem in the 4G era, IMS can well meet the communication between people in the 4G era. IMS is significantly characterized by employing a SIP system, performing communications irrelevant to the access manner, and having a plurality of capabilities such as separating a control function of a plurality of multimedia services from a bearing capability, separating a call from a session, separating an application from a service, separating a service from a network, and merging a mobile network with an Internet service.

IMS is used as a future voice/video communication system in the 3GPP standard, but the existing IMS architecture implements multiple applications with the following deficiencies:

1) The protocols used when accessing new applications are limited. In the conventional IMS architecture, the signaling plane protocols are mainly application protocols such as SIP, HyperText Transfer Protocol (HTTP) and Diameter, and the media plane protocols are mainly application protocols such as RTP/RTCP and MSRP. If new applications need to use new application protocols, there will be difficulties when accessing an IMS communication network, which greatly limits the introduction of new applications, such as video live broadcast, games and so on.

2) It is difficult for new applications to interface. With the development of 5G networks and future networks, the demand for various applications is growing rapidly, and interactive applications such as AR/VR are emerging. However, the conventional IMS system architecture employs the service trigger mode of Call Session Control Function (CSCF). Newly added applications need to interface with CSCF, and meanwhile need to consider the nesting relationship with existing services, which greatly increases the difficulty in deploying new media applications.

3) Newly added media functions require updating and renovating of multiple functional entities and cannot be deployed quickly. In the conventional IMS system architecture, the newly added applications need to be implemented by adding a new media line (m=) in the Session Description Protocol (SDP), which causes multiple functional entities in the IMS network to be upgraded and renovated, for example, an Session Border Controller (SBC) responsible for terminal device access/Proxy-Call Session Control Function (P-CSCF), a Telephony Application Server (TAS) responsible for implementing a basic supplemental service, a Media Resource Function Processor (MRFP) used by the application server; IP Interconnection Border Control Function (IBCF) and Transition Gateway (TrGW) responsible for IMS interworking. This makes new applications difficult to be deployed quickly, and operators are affected in the time for releasing applications.

In view of the above, embodiments of the present disclosure provide a communication method, a signaling control network element, a media control network element and a communication system. The communication method comprises, but is not limited to, the following steps: acquiring a transparent transmission channel creation request, wherein the transparent transmission channel creation request comprises an application identifier corresponding to an application entity among application entities and a first terminal device identifier corresponding to a first terminal device among terminal devices which need to create the transparent transmission channel; performing, according to the transparent transmission channel creation request, negotiation processing on a media control network element and the first terminal device, so as to create a transparent transmission channel between the media control network element and the first terminal device; sending the application identifier to the media control network element, so that the media control network element determines a data transmission relationship between the transparent transmission channel and the application entity corresponding to the application identifier. Since the first terminal device can directly perform data transmission with the application entity via the transparent transmission channel, when a new application is developed, the existing system needn't be updated, which greatly improves the utilization rate of media resources and the expansion capability of the new media application.

Embodiments of the present disclosure will now be further described with reference to the accompanying drawings.

As shown in FIG. 1, FIG. 1 is a schematic diagram of a system architecture platform 100 for implementing a communication method according to one embodiment of the present disclosure.

In the example of FIG. 1, the system architecture platform 100 comprises a terminal device 110, a CSCF 120, a signaling control network element 130, an application entity 140, a media control network element 150 and a Home Subscriber Server (HSS); the CSCF 120 comprises a session control entity (US-CSCF) and an IMS access network element (SBC/P-CSCF); the home subscriber server 160 is connected to the session control entity; the terminal device 110, the IMS access network element, the session control entity, the signaling control network element 130 and the application entity 140 are connected in sequence; and the signaling control network element 130 is connected to the media control network element 150.

The signaling control network element 130 may be an application socket entity, and the physical form of the signaling control network element 130 is not exclusively limited in the present embodiment.

The media control network element 150 may be a media socket entity, and the physical form of the signaling control network element 130 is not exclusively limited in the present embodiment.

The signaling control network element 130 of the multi-application system undertakes an IMS call management capability; as a capability network element for multi-application access, the signaling control network element 130 has a capability of providing openness of a communication capability, which may include, but is not limited to the following functions:

(1) Providing the management of audio/video calls and transparent transmission channel calls, including but not limited to the establishment of calls, redirection of media paths, teardown of calls, reporting of call events, etc.

(2) Providing openness of a communication capability, and the application entity 140 may achieve the control of a call for an audio/video and a call for the transparent transmission channel and an application for media service resources etc. via an open interface provided by the signaling network element 130.

(3) Providing a management function for a media control network element 150, and managing the media control network element 150 according to a control instruction of an application entity 140, including but not limited to: application, modification and deletion of transparent transmission channel; application, modification and deletion of audio/video conference resources; application, modification and deletion of AR marking capability; application, modification and deletion of speech recognition capability; application, modification and deletion of face recognition capability; application, modification and deletion of "AI capability."

(4) Providing auxiliary functions such as charging, network management and statistics, to provide support for the operation and maintenance of multiple applications; in the present disclosure, there is no special requirements for such functions.

The media control network element 150 provides media services for a multi-application system, including, but not limited to, the following functions:

(1) Providing management of media capabilities, respectively interfacing with network elements such as the "signaling control network element 130," the "application entity 140" and the "IMS access network element (SBC/P-CSCF)," and taking the responsibility for the creation, modification and deletion of media resources;

(2) Providing management of the transparent transmission channel, and taking the responsibility for the creation, modification and deletion of transparent transmission channel; and (3) Providing the forwarding of data of multiple applications, the media control network element 150 entity receives application data from the application entity 140 and forwards the application data to the terminal device 110 via the transparent transmission channel; or the terminal device 110 sends the application data to the media control network element 150 entity via the transparent transmission channel, and the media control network element 150 entity extracts the application data and forwards the application data to the application entity 140.

The application entity 140 provides the service logic of the application. The application entity 140 interfaces with the signaling control network element 130, acquires session event information from the signaling control network element 130, and controls a session according to service logic, which may include, but is not limited to, the following functions:

(1) Modifying a media path of a session, and anchoring the session media to the media control network element 150 entity; and (2) Increasing the media content of the session and increasing the media content on the basis of the original session media.

The application entity 140 interfaces with the media control network element 150 entity and sends the application data to the terminal device 110 via the transparent transmission channel of the media control network element 150 entity; and receives the application data from a terminal device 110 side through the transparent transmission channel of the media control network element 150 entity.

The access control entity provides the terminal device 110 with access functions of signaling plane and media plane. In the present embodiment, the access control entity supports negotiation of a transparent transmission channel session, and as a forwarding entity of the transparent transmission channel, establishes a media channel with the "terminal device 110" and the "media control network element 150 entity," respectively, to realize the forwarding of transparent data.

The terminal device 110 provides a service experience for an end user by interacting with a network-side entity. In the present embodiment, the terminal device 110 supports session negotiation of the transparent transmission channel with the network side, receives application data from the network side via the transparent transmission channel, and performs local processing and interface presentation; or passes the application data operated by the user from the transparent transmission channel to the network side to realize specific service logic.

The terminal device 110 may also be referred to as a user equipment (UE), an access terminal, a user unit, a user station, a mobile station, a remote station, a remote terminal, a mobile device, a user terminal, a terminal, a wireless communication device, a user agent, or a user device. The terminal device 110 in the embodiments of the present disclosure may be a mobile phone, a Pad, a computer with a wireless transceiving function, a virtual reality (VR) terminal device 110, an augmented reality (AR) terminal device 110, a wireless terminal in industrial control, a wireless terminal in self driving, a wireless terminal in a remote medical care, a wireless terminal in a smart grid, a wireless terminal in transportation safety, a wireless terminal in a smart city, a wireless terminal in a smart home, or other terminal device. The embodiments of the present disclosure do not limit application scenarios. The terminal device 110 having a wireless transceiving function and a chip which can be provided on the previously mentioned terminal device 110 are collectively referred to as the terminal device 110 in the present disclosure.

The application data protocol between the terminal device and the application entity may use a standard protocol such as HTTP/MSRP/RTP, or may use a self-defined protocol, which is not specifically limited in the present implementation.

It can be appreciated by a person skilled in the art that the system architecture platform may be applied to a 2G, 3G, 4G or 5G communication network system and a subsequently evolved mobile communication network system, etc, which is not specifically defined in the present embodiment.

It may be appreciated by those skilled in the art that the system architecture platform shown in FIG. 1 do not constitute any restrictions to the embodiments of the present disclosure and may include more or fewer components than shown, or combine some components, or different component arrangements.

Based on the system architecture platform described above, respective embodiments of the communication method of the present disclosure are presented below.

Figure 2:
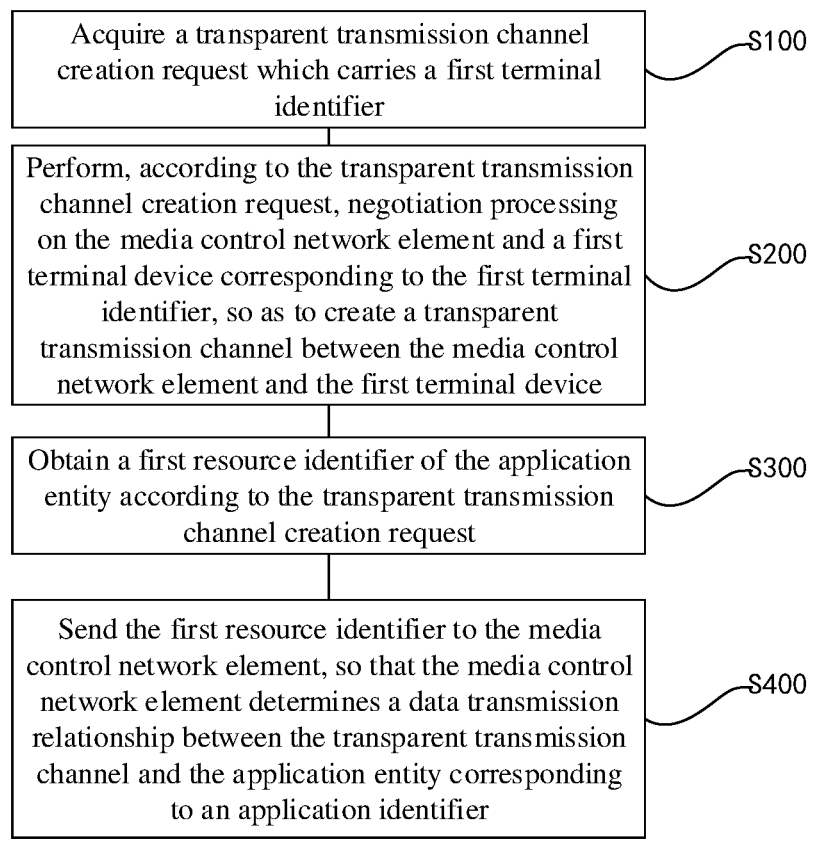
FIG. 2 is a flow chart of a communication method on a side of a signaling control network element according to one embodiment of the present disclosure.

As shown in FIG. 2 which is a flow chart of a communication method provided by an embodiment of the present disclosure, the communication method is applied to a signaling control network element, and the communication method comprises, but not limited to, step S100, step S200, step S300 and step S400.

Step S100: acquiring a transparent transmission channel creation request which carries a first terminal identifier.

It may be appreciated that the transparent transmission channel creation request characterizes a need to create a transparent transmission channel between the media control network element and the first terminal device corresponding to the first terminal identifier, the transparent transmission channel having a function of transferring different application protocols.

It is explained that the transparent transport channel creation request may be sent by the application entity or by the first terminal device via the CSCF, which is not specifically limited by the present embodiment.

Step S200: performing, according to the transparent transmission channel creation request, negotiation processing on a media control network element and a first terminal device corresponding to a first terminal identifier, to create a transparent transmission channel between the media control network element and the first terminal device.

The signaling control network element has a function of performing negotiation processing on the media control network element and the first terminal device, and the signaling control network element performs negotiation processing on the media control network element and the first terminal device corresponding to the first terminal identifier according to the transparent transmission channel creation request. For example, the signaling control network element may forward transparent transmission channel resource information sent by the media control network element to the first terminal device, and may also forward information, such as a transparent transmission channel creation reply, sent by the first terminal device to the media control network element, so as to create the transparent transmission channel between the media control network element and the first terminal device.

Step S300: obtaining a first resource identifier of an application entity according to the transparent transmission channel creation request.

It may be appreciated that the first resource identifier of the application entity may be resource information carried in the transparent transmission channel creation request and can also be resource information obtained by applying for resources from the application entity according to the transparent transmission channel creation request, which is not specifically limited in the present embodiment.

Step S400: sending the first resource identifier to the media control network element, so that the media control network element determines a data transmission relationship between the transparent transmission channel and the application entity corresponding to an application identifier.

It may be appreciated that since the transparent transmission channel is already created between the media control network element and the first terminal device, the media control network element may determine the data transmission relationship between the transparent transmission channel and the application entity corresponding to the application identifier according to the first resource identifier, that is to say, the media control network element may forward the data transmitted by the first terminal device through the transparent transmission channel to the application entity, and may also directly forward the data transmitted by the application entity to the first terminal device via the transparent transmission channel, so that the application entity and the first terminal device can transmit data via the transparent transmission channel.

Specifically, the signaling control network element acquires the transparent transmission channel creation request which carries the first terminal identifier, performs, according to the transparent transmission channel creation request, negotiation processing on the media control network element and the first terminal device corresponding to the first terminal identifier, so as to create the transparent transmission channel between the media control network element and the first terminal device so that the first terminal performs data transmission with the application entity through the transparent transmission channel; obtains the first resource identifier of the application entity according to the transparent transmission channel creation request; and sends the first resource identifier to the media control network element, so that the media control network element determines a data transmission relationship between the transparent transmission channel and the application entity corresponding to an application identifier, so that the application entity and the first terminal device may perform data transmission through the transparent transmission channel. Since the created transparent transmission channel has a function of transferring different application protocols, when a new application is developed, the existing system needn't be updated, which greatly improves the utilization rate of media resources and the expansion capability of the new media application.

Figure 3:
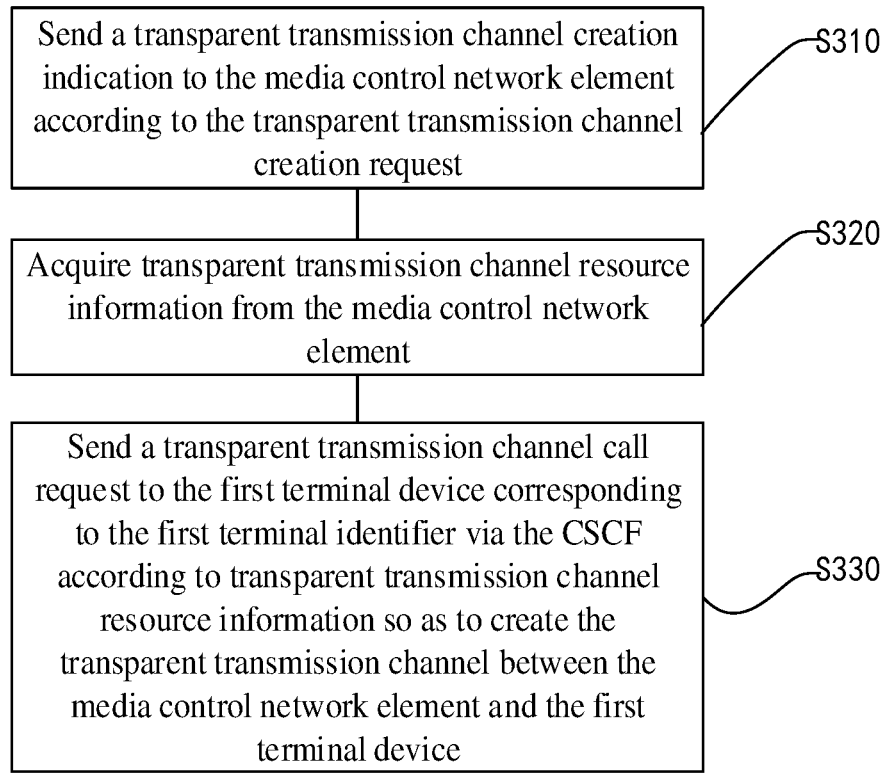
FIG. 3 is a flow chart of a transparent transmission channel creation request coming from an application entity in a communication method on a side of a signaling control network element according to one embodiment of the present disclosure.

Referring to FIG. 3, when the transparent transmission channel creation request comes from the application entity, step S200 includes, but is not limited to, step S310, step S320 and step S330.

Step S310: sending a transparent transmission channel creation indication to the media control network element according to the transparent transmission channel creation request.

Step S320: acquiring transparent transmission channel resource information from the media control network element.

Step S330: sending a transparent transmission channel call request to the first terminal device corresponding to the first terminal identifier through a CSCF according to transparent transmission channel resource information to create the transparent transmission channel between the media control network element and the first terminal device.

Specifically, upon acquiring the transparent transmission channel creation request sent by the application entity, the signaling control network element sends the transparent transmission channel creation indication to the media control network element according to the transparent transmission channel creation request, then the signaling control network element acquires transparent transmission channel resource information from the media control network element, and then the signaling control network element sends the transparent transmission channel call request to the first terminal device corresponding to the first terminal identifier through a CSCF according to transparent transmission channel resource information so as to create the transparent transmission channel between the media control network element and the first terminal device. The created transparent transmission channel has a function of transferring different application protocols.

Figure 4:
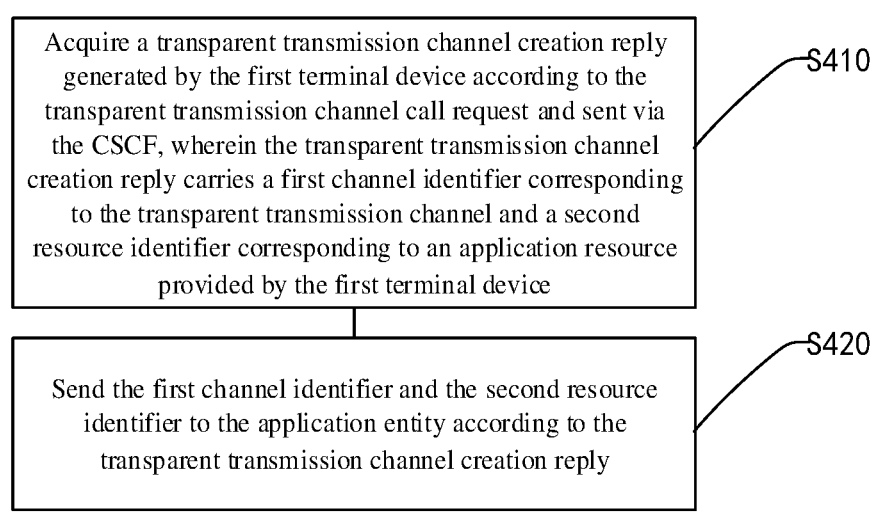
FIG. 4 is a flow chart of sending acknowledgement information to an application entity in a communication method on a side of a signaling control network element according to one embodiment of the present disclosure.

Referring to FIG. 4, the communication method in the embodiment based on FIG. 3 further comprises, but is not limited to, steps S410 and S420.

Step S410: acquiring a transparent transmission channel creation reply generated by the first terminal device according to the transparent transmission channel call request and sent by the CSCF, wherein the transparent transmission channel creation reply carries a first channel identifier corresponding to the transparent transmission channel and a second resource identifier corresponding to an application resource provided by the first terminal device.

Step S420: sending the first channel identifier and the second resource identifier to the application entity according to the transparent transmission channel creation reply.

Specifically, the signaling control network element acquires the transparent transmission channel creation reply generated by the first terminal device according to the transparent transmission channel call request and sent by the CSCF, wherein the transparent transmission channel creation reply carries the first channel identifier corresponding to the transparent transmission channel and the second resource identifier corresponding to the application resource provided by the first terminal device, and sends the first channel identifier and the second resource identifier to the application entity according to the transparent transmission channel creation reply, so that the application entity may complete resource negotiation on the application layers with the media control network element, and the application entity is enabled to perform data transmission with the first terminal device through the transparent transmission channel. Since the created transparent transmission channel has a function of transferring different application protocols, when a new application is developed, the existing system needn't be updated, which greatly improves the utilization rate of media resources and the expansion capability of the new media application.

Figure 5:
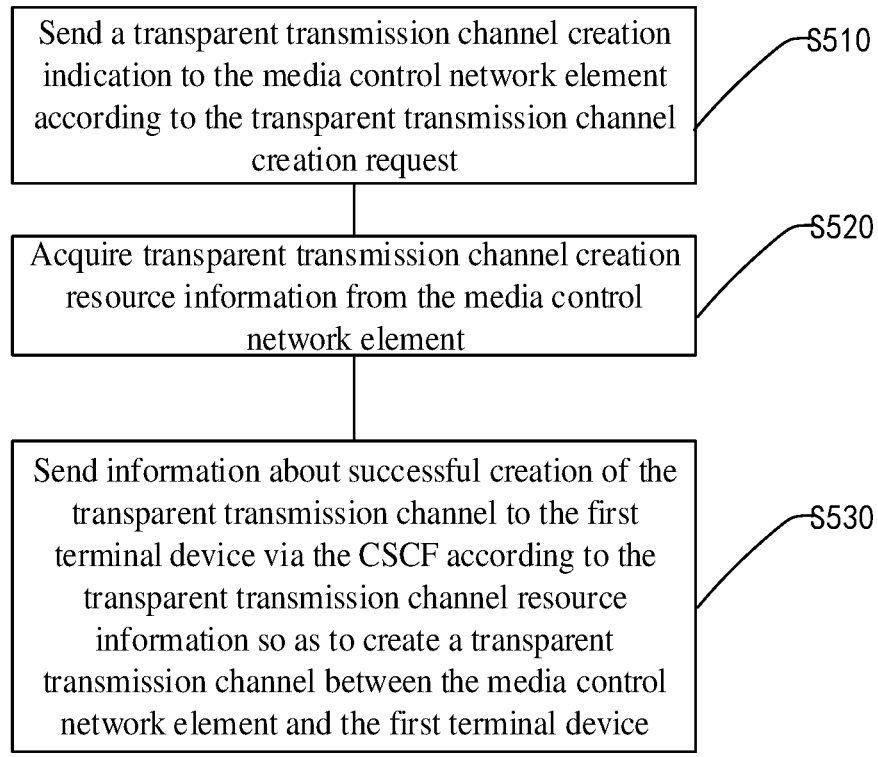
FIG. 5 is a flow chart when a transparent transmission channel creation request is sent by a first terminal device through a CSCF in a communication method on a side of a signaling control network element according to one embodiment of the present disclosure.

With reference to FIG. 5, when the transparent transmission channel creation request is sent by the first terminal device via the CSCF, step S200 comprises, but is not limited to, step S510, step S520 and step S530:

Step S510: sending a transparent transmission channel creation indication to the media control network element according to the transparent transmission channel creation request.

Step S520: acquiring transparent transmission channel creation resource information from the media control network element.

Step S530: sending information about successful creation of the transparent transmission channel to the first terminal device via the CSCF according to the transparent transmission channel resource information to create a transparent transmission channel between the media control network element and the first terminal device.

Specifically, upon acquiring the transparent transmission channel creation request sent by the first terminal device via the CSCF, the signaling control network element sends the transparent transmission channel creation indication to the media control network element according to the transparent transmission channel creation request, and then the signaling control network element acquires transparent transmission channel resource information from the media control network element; and the signaling control network element then sends a transparent transmission channel call request to the first terminal device via the CSCF according to the transparent transmission channel resource information so as to create the transparent transmission channel between the media control network element and the first terminal device. The created transparent transmission channel has a function of transferring different application protocols.

Figure 6:
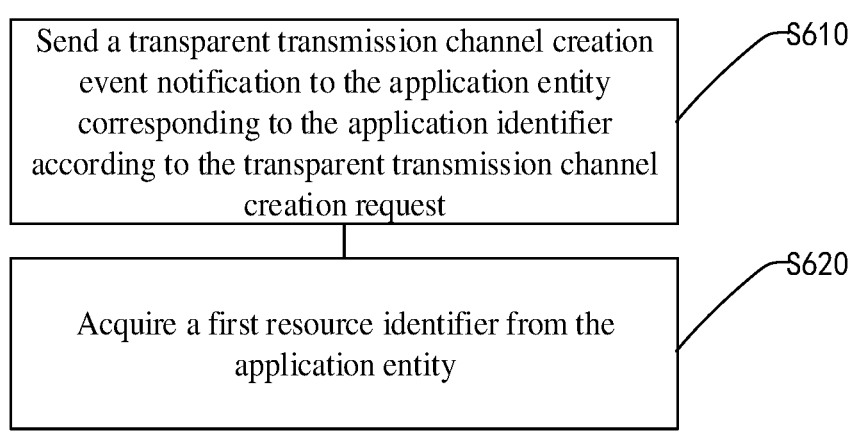
FIG. 6 is a flow chart for acquiring a first resource identifier from an application entity in a communication method on a side of a signaling control network element according to one embodiment of the present disclosure.

Referring to FIG. 6, the transparent transmission channel creation request carries an application identifier, and step S300 includes, but is not limited to, steps S610 and S620.

Step S610: sending a transparent transmission channel creation event notification to the application entity corresponding to the application identifier according to the transparent transmission channel creation request.

Step S620: acquiring a first resource identifier from the application entity.

Specifically, the signaling control network element may obtain the application identifier from the transparent transmission channel creation request sent by the first terminal device via the CSCF and may send the transparent transmission channel creation event notification to the application entity corresponding to the application identifier according to the application identifier to acquire the first resource identifier from the application entity.

Figure 7:
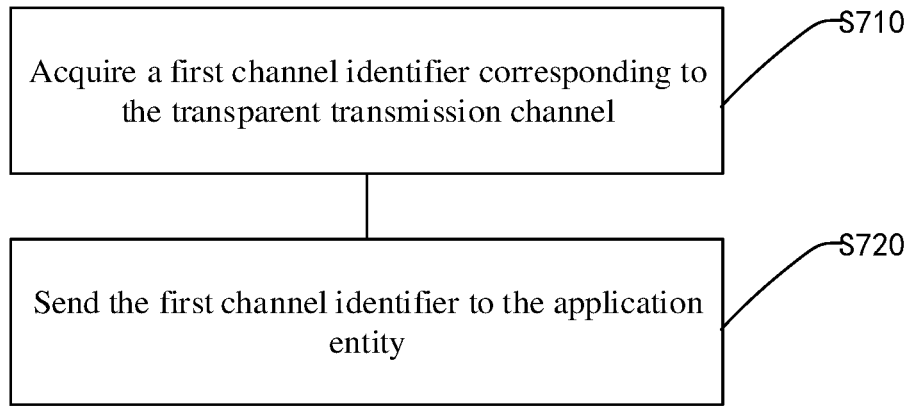
FIG. 7 is a flow chart of sending a first channel identifier to an application entity in a communication method on a side of a signaling control network element according to one embodiment of the present disclosure.

Referring to FIG. 7, the communication method based on the embodiments of FIG. 5 and FIG. 6 further comprises, but is not limited to, steps S710 and S720.

Step S710: acquiring a first channel identifier corresponding to the transparent transmission channel.

Step S720: sending the first channel identifier to the application entity.

Specifically, the signaling control network element may acquire the first channel identifier corresponding to the transparent transmission channel and sends the first channel identifier to the application entity, so that the application entity may complete resource negotiation on the application layers with the media control network element, and the application entity is enabled to perform data transmission with the first terminal device through the transparent transmission channel. Since the created transparent transmission channel has a function of transferring different application protocols, when a new application is developed, the existing system needn't be updated, which greatly improves the utilization rate of media resources and the expansion capability of the new media application.

Figure 8:
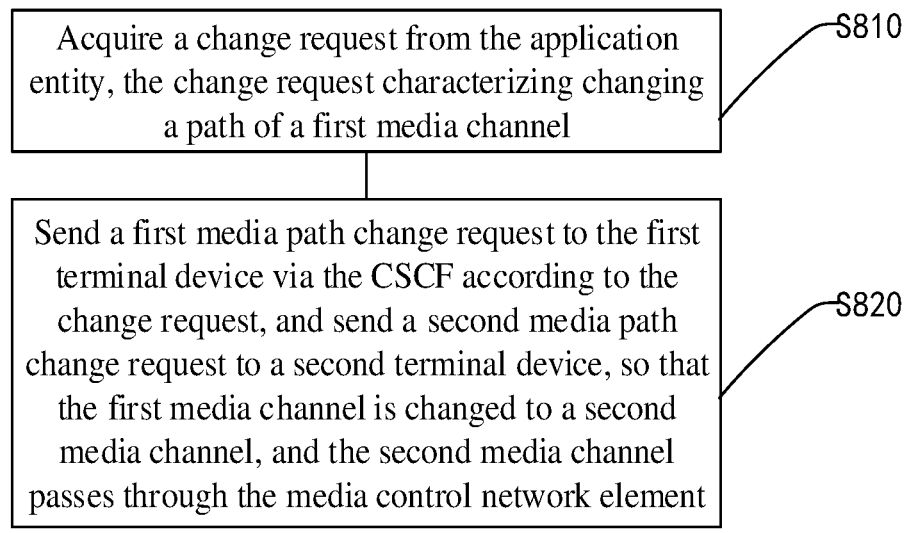
FIG. 8 is a flowchart of changing a first media channel to a second media channel in a communication method on a side of a signaling control network element according to one embodiment of the present disclosure.

With reference to FIG. 8, the terminal device further comprises a second terminal device, and the communication method in the above embodiment further comprises, but is not limited to, steps S810 and S820.

Step S810: acquiring a change request from the application entity, wherein the change request represents changing a path of a first media channel.

Step S820: sending a first media path change request to the first terminal device via the CSCF according to the change request and sending a second media path change request to a second terminal device, so that the first media channel is changed to a second media channel, and the second media channel passes through the media control network element.

Specifically, if the terminal device comprises the first terminal device and the second terminal device, when the first terminal device and the second terminal device need to simultaneously acquire data sent by the same application entity, so that the first terminal device which transmits data with the application entity via the transparent transmission channel may send a service application request to the application entity via the transparent transmission channel. For example, the service application request may carry operation information about a service to be executed and associated video call information, then the signaling control network element will acquire a change request from the application entity, the change request characterizing changing the path of the first media channel, and then the signaling control network element sends a first media path change request to the first terminal device via the CSCF according to the change request, and sends a second media path change request to the second terminal device, so that the first media channel is changed to the second media channel, and the second media channel passes through the media control network element, such that both the first terminal device and the second terminal device can acquire relevant data information to the application entity via the media control network element, to complete the demand for the service.

Figure 9:
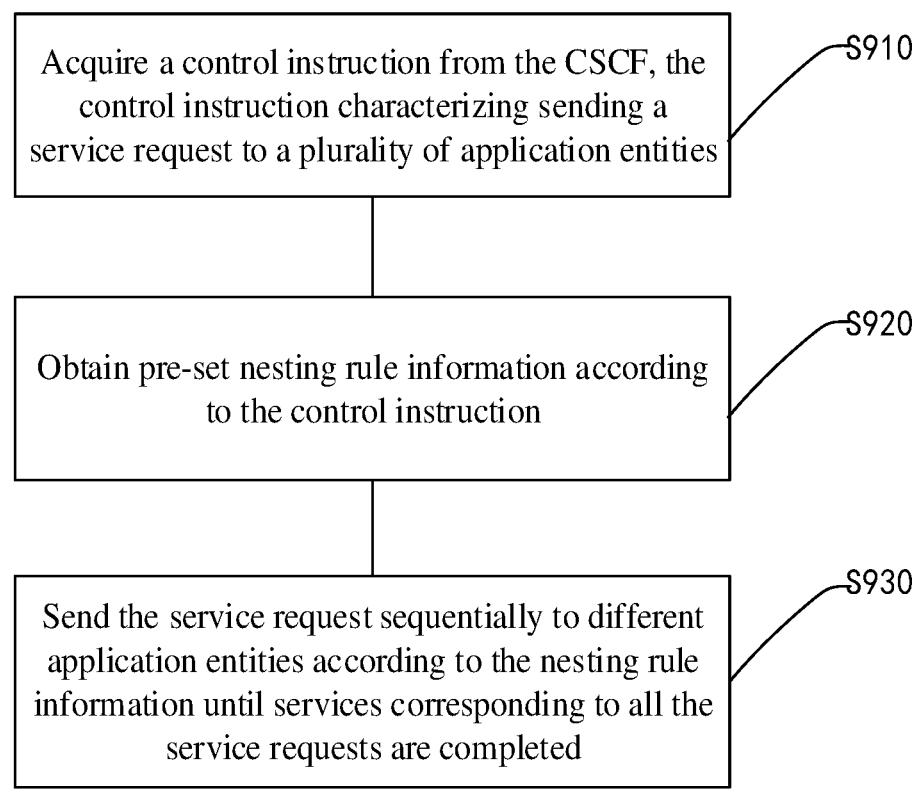
FIG. 9 is a flow chart of sending a service request to a plurality of application entities according to nesting rule information in a communication method on a side of a signaling control network element according to one embodiment of the present disclosure.

Referring to FIG. 9, there are a plurality of application entities, and the communication method in the above-mentioned embodiments further comprises, but is not limited to, steps S910 and S920.

Step S910: acquiring a control instruction from the CSCF, the control instruction characterizing sending a service request to a plurality of application entities.

Step S920: obtaining pre-set nesting rule information according to the control instruction.

Step S930: sending the service request sequentially to different application entities according to the nesting rule information until services corresponding to all the service requests are completed.

Specifically, if there are a plurality of application entities, when a service request needs to be sent to the plurality of application entities, the signaling control network element will acquire a control instruction from the CSCF, the control instruction charactering sending a service request to the plurality of application entities, then obtain preset nesting rule information according to the control instruction, and then sending the service request sequentially to different application entities according to the nesting rule information. After the first application entity completes the service, the service request is sent to the second application entity, and so on, until the services corresponding to all the service requests are completed. A scenario for applying for a service to a plurality of application entities may be satisfied by the method.

Figure 10:
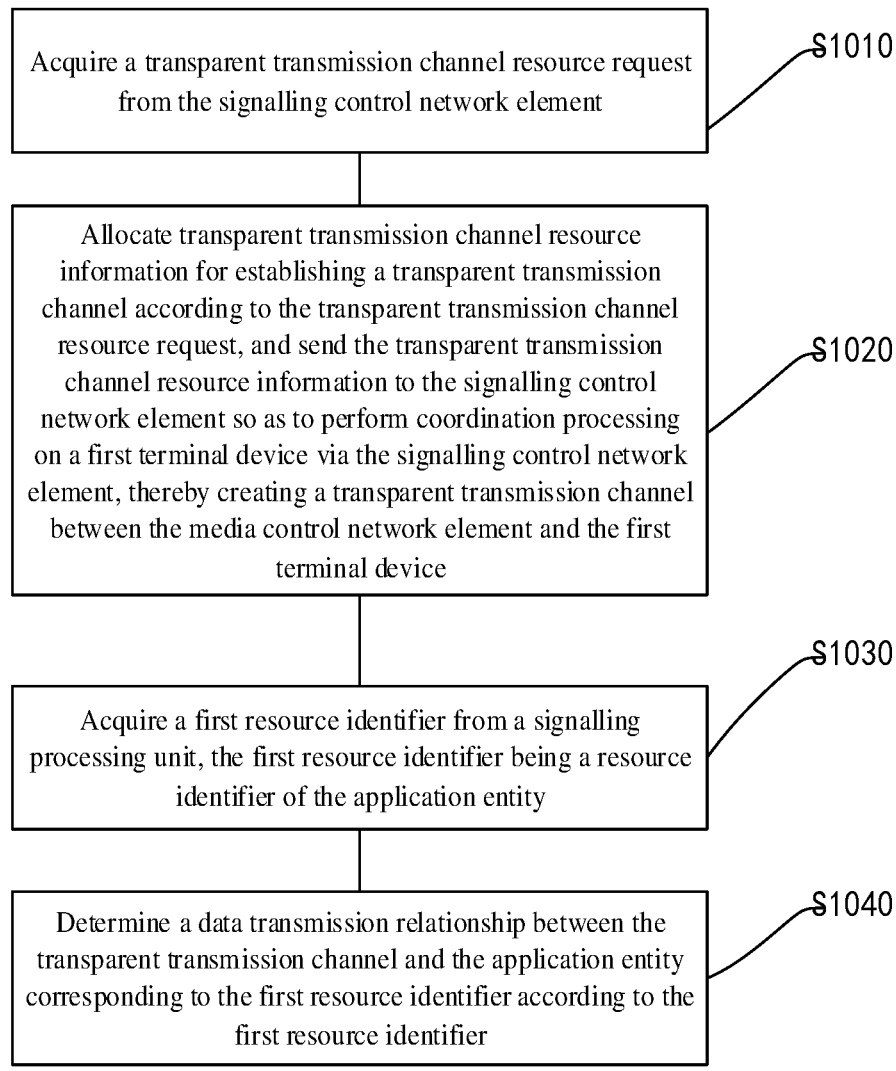
FIG. 10 is a flow chart of a communication method on a side of a media control network element according to one embodiment of the present disclosure.

As shown in FIG. 10 which is a flow chart of a communication method provided by another embodiment of the present disclosure, the communication method is applied to the media control network element, and the communication method comprises, but is not limited to, step S1010, step S1020, step S1030 and step S1040.

Step S1010: acquiring a transparent transmission channel resource request from a signaling control network element.

Step S1020: allocating transparent transmission channel resource information for establishing a transparent transmission channel according to the transparent transmission channel resource request, and sending the transparent transmission channel resource information to the signaling control network element so as to perform coordination processing on a first terminal device via the signaling control network element, thereby creating a transparent transmission channel between the media control network element and the first terminal device.

Step S1030: acquiring a first resource identifier from a signaling processing unit, the first resource identifier being a resource identifier of an application entity.

Step S1040: determining a data transmission relationship between the transparent transmission channel and the application entity corresponding to the first resource identifier according to the first resource identifier.

Specifically, after acquiring the transparent transmission channel resource request from the signaling control network element, the media control network element may allocate the transparent transmission channel resource information for establishing a transparent transmission channel according to the transparent transmission channel resource request and send the transparent transmission channel resource information to the signaling control network element to perform coordination processing on a first terminal device via the signaling control network element to create the transparent transmission channel between the media control network element and the first terminal device. The media control network element may acquire a first resource identifier from a signaling processing unit, the first resource identifier being a resource identifier of an application entity and determine a data transmission relationship between the transparent transmission channel and the application entity corresponding to the first resource identifier according to the first resource identifier, so that the application entity and the first terminal device may perform data transmission via the transparent transmission channel. Since the created transparent transmission channel has a function of transferring different application protocols, when a new application is developed, the existing system needn't be updated, which greatly improves the utilization rate of media resources and the expansion capability of the new media application.

Figure 11:
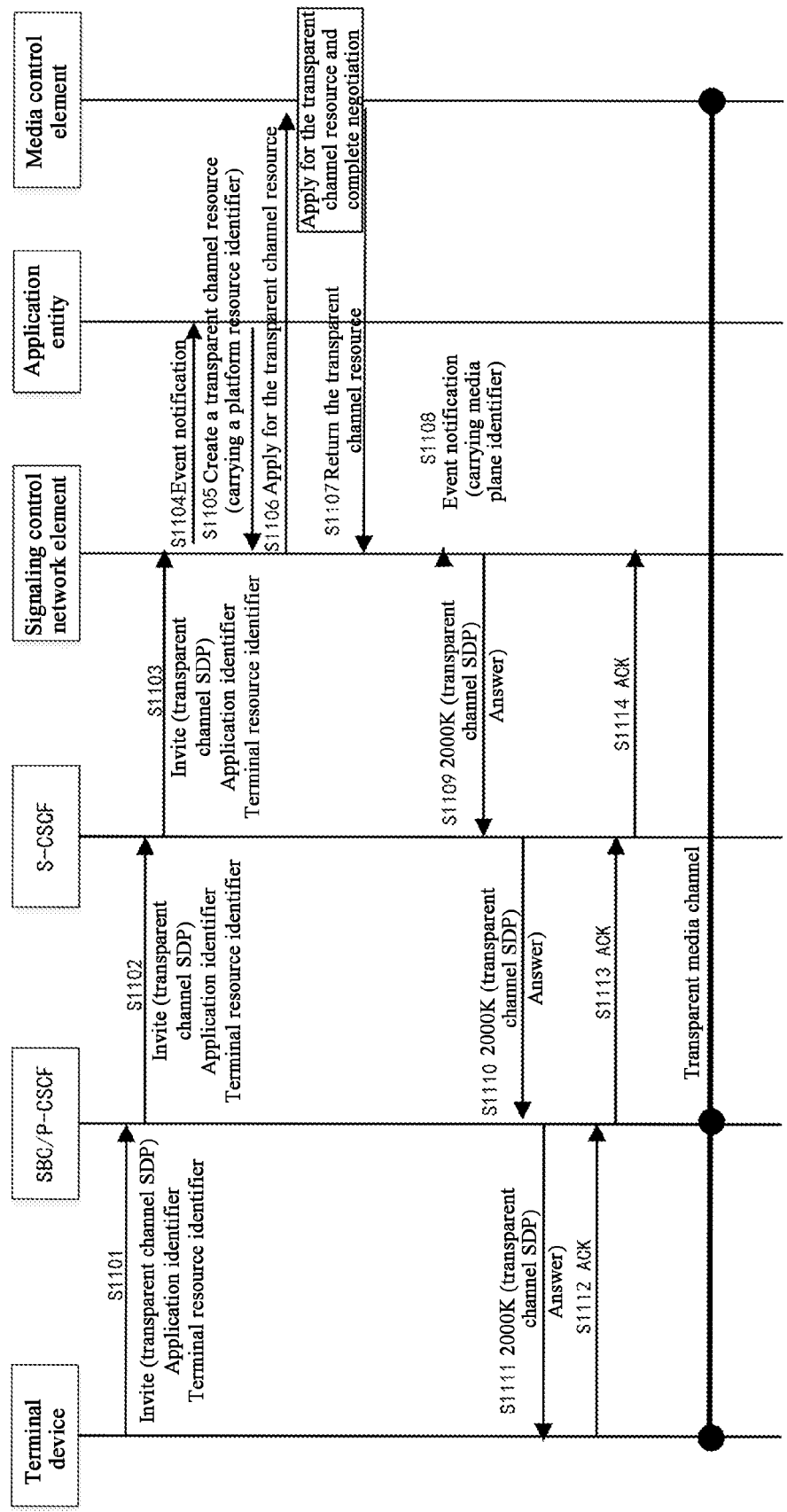
FIG. 11 is a flow chart for initiating by a terminal device a call to an application entity in a communication method of a communication system according to an embodiment of the present disclosure.

As shown in FIG. 11, FIG. 11 is a flow chart of a communication method according to another embodiment of the present disclosure. The communication method is applied to the overall system architecture of FIG. 1. The present embodiment implements bidirectional communication between a terminal device and an application and is mainly described by taking a multi-application terminal device initiating a call to an application entity as an example, wherein the call uses an IMS as a communication network and a SIP protocol as a communication protocol, and other signaling systems are also applicable to the method of the present disclosure.

The call of the transparent transmission channel in the present embodiment may be in the same session as an ordinary audio-video call or may be in a different session from the ordinary audio-video call and described in an independent call manner.

In Step 1101, a calling side terminal UE sends a call request (INVITE) to an SBC/P-CSCF, wherein a media type identifier of a transparent transmission channel is carried in a media line in the SDP description.

It may be appreciated that the transparent transmission channel indicates that the data of the channel needn't be perceived by an intermediate network element, and the information of the transparent transmission channel carried in the SDP comprises information such as an IP address and a port of a terminal side, an application protocol used in the transparent transmission channel, and a resource identifier of the present application at the terminal side.

In Step 1102, the SBC/P-CSCF applies for a forwarding resource of the transparent transmission channel, then forwards a call request (INVITE) to the S-CSCF, and modifies, in the SDP, an IP address and a port of the terminal side into an IP address and a port of an SBC/P-CSCF network side, and the content of other terminal sides in the SDP remain unchanged.

In Step 1103, the S-CSCF triggers an INVITE request to the signaling control network element according to a call indication of creating the transparent transmission channel in the INVITE request.

In Step 1104, the signaling control network element converts the INVITE request into a call event and sends the same to an application entity, wherein the call event carries content such as an indication for creating the transparent transmission channel, and transparent transmission channel information.

In Step 1105, according to a processing logic of the application, the application entity indicates the signaling control network element to create the transparent transmission channel so as to realize application data exchange with the terminal, wherein the indication sent to the signaling control network element contains a resource identifier of the application entity, and the identifier is used for the multi-application terminal to distinguish different application entities.

In Step 1106, the signaling control network element applies to the media control network element for a media resource according to the indication of the application entity.

It may be appreciated that the signaling control network element may also directly apply to the media control network element for a media resource without the indication of the application entity.

In Step 1107, the media control network element allocates a transparent transmission channel resource and returns the resource information to the signaling control network element after negotiating with the transparent transmission channel information at the terminal device side.

In Step 1108, the signaling control network element sends a notification message, to the application entity to notify that the transparent transmission channel has been created successfully, and corresponding information about the transparent transmission channel.

In Step 1109, the signaling control network element returns an answer response (200 OK) to the S-CSCF, wherein the answer response carries information of the transparent transmission channel and resource information of the application entity.

In Step 1110, the S-CSCF forwards the answer response to the SBC/P-CSCF.

In Step 1111, the SBC/P-CSCF replaces the IP address and a port in the application response with an IP address and a port of the SBC/P-CSCF, and then forwards the answer response to the terminal device.

In Step 1112, the terminal device extracts transparent transmission channel information and resource identifier information of the application entity from the answer response, and then returns an acknowledgement message (ACK) to the SBC/P-CSCF.

In Step 1113, the SBC/P-CSCF forwards the acknowledgement message (ACK) to the S-CSCF.

In Step 1114, the S-CSCF forwards the acknowledgement message (ACK) to the signaling control network element.

It may be appreciated that the terminal device may communicate with the media control network element via the transparent transmission channel, and the media control network element forwards data to the application entity and carries a resource identifier of the application entity in the application data, so that the application entity may distinguish different service requests; on the other hand, the application entity also sends application data to the terminal device via a transparent transmission channel of the media control network element, wherein a terminal resource identifier is contained in the application data, so that the terminal device may distinguish different service requests and realize different processing logics.

Figure 12:
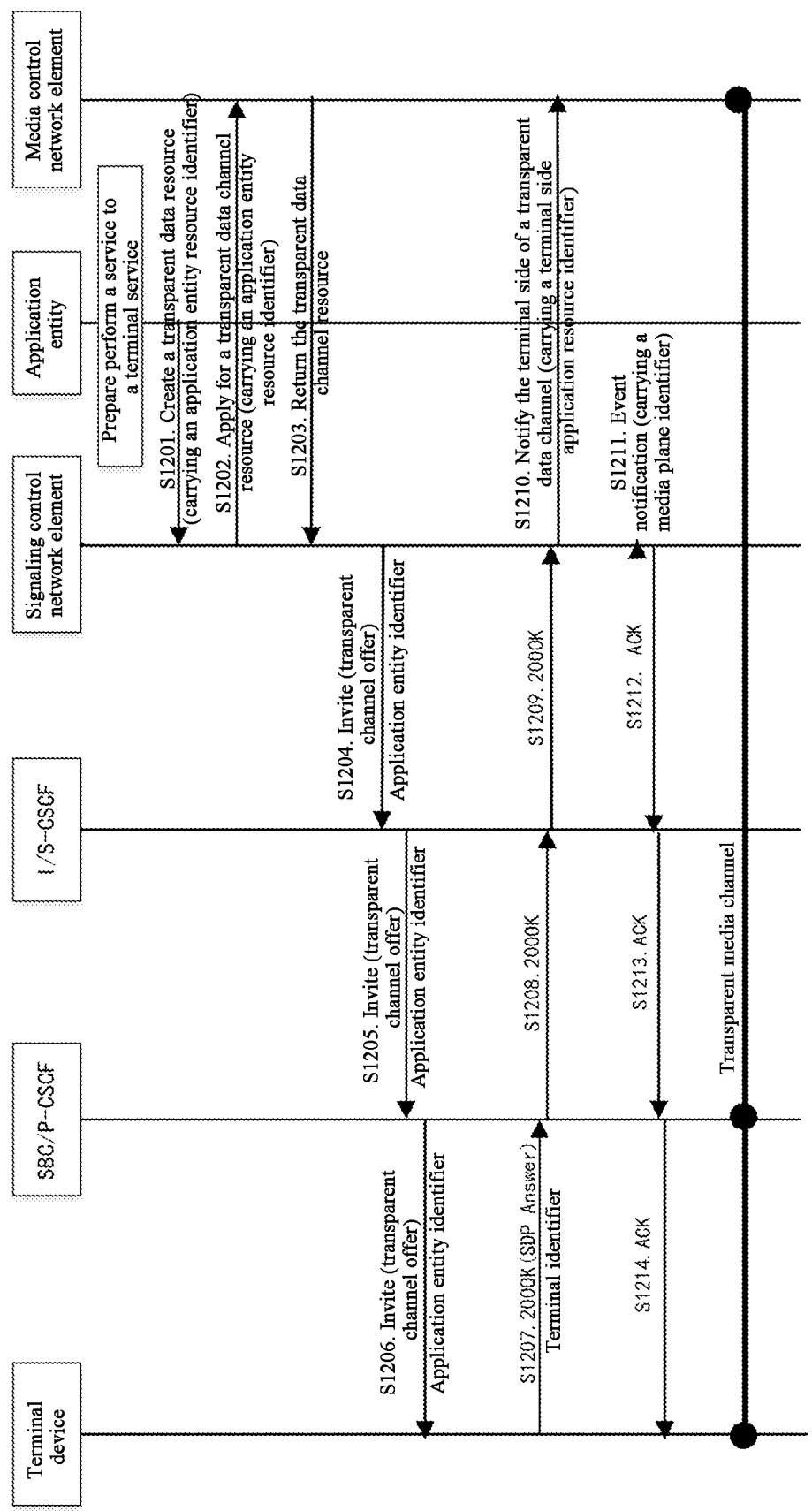
FIG. 12 is a flow chart for initiating by an application entity a call to a terminal device in a communication method of a communication system according to an embodiment of the present disclosure.

As shown in FIG. 12 which is a flow chart of a communication method according to another embodiment of the present disclosure, the communication method is applied to the overall system architecture of FIG. 1. The present embodiment is an embodiment in which the application entity initiates a call to the terminal device and that describes a process in which the present disclosure enables bidirectional communication between the application entity and the terminal device, wherein the call is described with IMS as the communication network and SIP protocol as the communication protocol, and other signaling systems are also applicable to the method of the present disclosure. The call of the transparent data transmission channel may be in the same session as or in a different session from an ordinary audio-video call.

In Step 1201, according to a service demand, an application entity needs to interact application data with a terminal and apply to a signaling control network element for a request to create a transparent data channel, wherein the request contains resource identifier information of the application entity.

In Step 1202, the signaling control network element sends a transparent data channel application to a media control network element, wherein the transparent data channel application contains resource identifier information of the application entity.

In Step 1203, the media control network element allocates a transparent data channel resource and returns the transparent data channel resource information to the signaling control network element.

In Step 1204, the signaling control network element sends a transparent data channel creation request (INVITE) to an I/S-CSCF, wherein the transparent data channel creation request carries the transparent data channel information and the application entity resource identifier.

In Step 1205, the I/S-CSCF forwards the transparent data channel creation request to a corresponding SBC/P-CSCF according to information recorded when the terminal registers.

In Step 1206, the SBC/P-CSCF determines that there is a media type identifier of the transparent data channel in a media line in the SDP description, indicating that the data of the channel needn't be perceived by an intermediate network element, and locally applies for a forwarding policy, IP and port information in the creation request being modified as its own information and then being forwarded to the terminal device.

In Step 1207, the terminal device locally prepares transparent data channel resources (IP, port number, memory, etc.), and returns an answer response (200 OK) to the SBC/P-CSCF, wherein the answer response carries transparent data channel information and a resource identifier allocated to the application by the terminal.

In Step 1208, the SBC/P-CSCF replaces the IP address and port number in the transparent data channel with its own IP address and port number, and then forwards 200 OK to the S-CSCF.

In Step 1209, the S-CSCF forwards the 200 OK to the signaling control network element.

In Step 1210, the signaling control network element sends the transparent data channel information at the terminal device side to the media control network element to enable the media control network element to complete the negotiation of the transparent data channel.

In Step 1211, the signaling control network element sends a notification to the application entity, wherein the notification carries information such as an application resource identifier and a transparent data channel of the terminal to enable the application entity to complete resource negotiation on an application layer.

In Step 1212, the signaling control network element returns an answer response acknowledgement message (ACK) to the I/S-CSCF, indicating the answer response has been received.

In Step 1213, the I/S-CSCF forwards the ACK to the SBC/P-CSCF.

In Step 1214, the SBC/P-CSCF forwards the ACK to the terminal device.

It may be appreciated that the application entity completes transparent data channel negotiation and application data interaction negotiation with the terminal device, and the application entity may perform application data interaction with the terminal device via a media socket entity.

Figure 13:
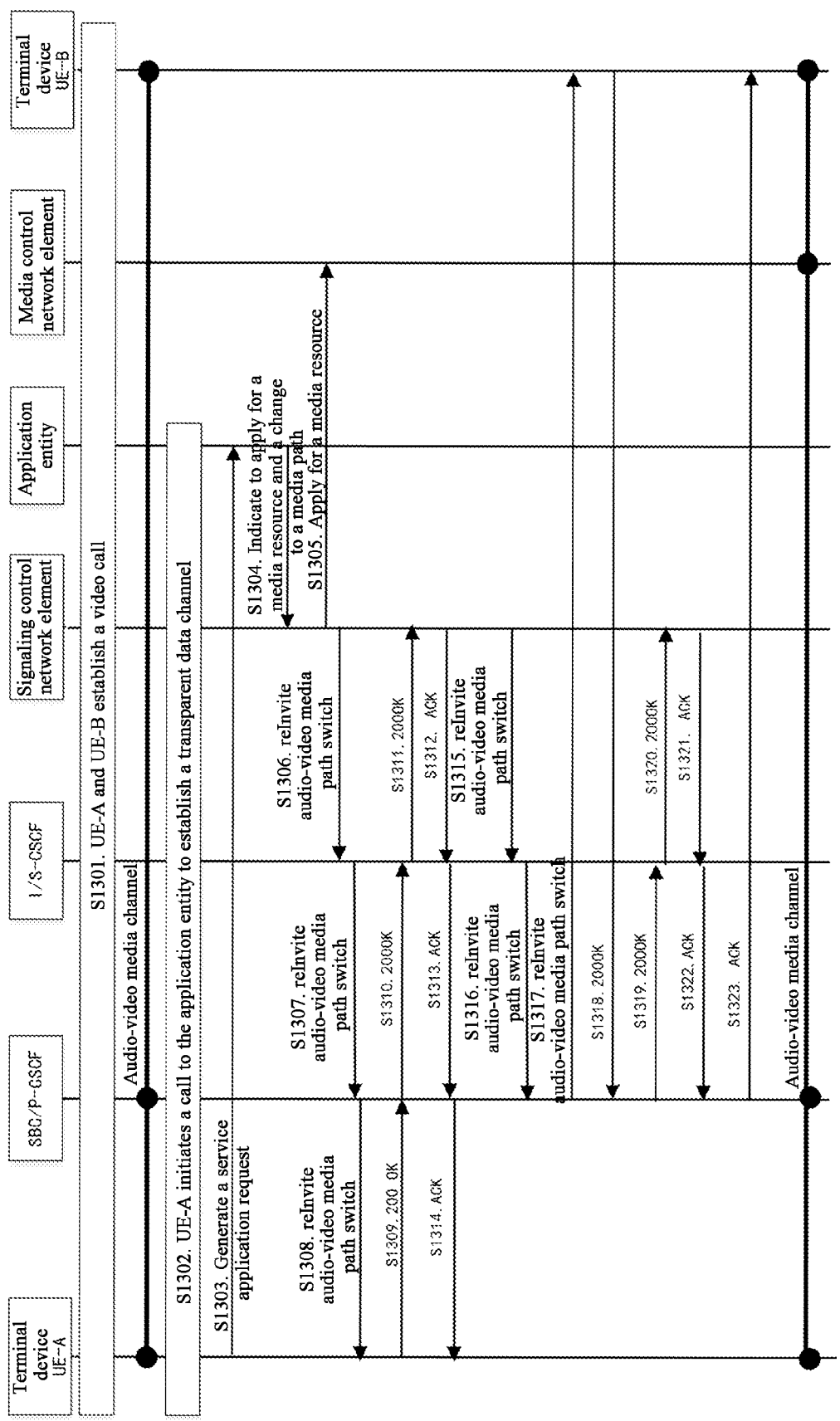
FIG. 13 is a flow chart of a user changing an audio-video media path through an application in a communication method of a communication system according to an embodiment of the present disclosure.

Referring to FIG. 13, which is a flow chart of a communication method according to another embodiment of the present disclosure, the communication method is applied to the overall system architecture of FIG. 1. The present embodiment is an embodiment in which a user may change an audio-video media path by an application and can achieve a change of the audio-video media path.

In Step 1301, a first terminal device UE-A establishes a video call with a second terminal device UE-B using a standard IMS flow, wherein the media flow is "UE-A<->SBC/P-CSCF<->UE-B".

In Step 1302, the UE-A executes a specific service and needs to use the transparent data channel. The UE-A initiates a transparent data channel establishment flow to the application entity (for details, see the embodiment of FIG. 11).

In Step 1303, the UE-A sends a service application request to the application entity via the transparent data channel, wherein the service application request carries a service operation to be executed and associated video call information.

In Step 1304, the application entity sends a request to the signaling control network element, wherein the request indicates to apply for a media resource (e.g., a conference resource) and a change to a media path of an original session.

In Step 1305, the signaling control network element applies to the media control network element for a media resource, the media resource being used for implementing a specific service.

In Step 1306, the signaling control network element initiates a media path change request to the UE-A, and sends a media renegotiation request re-INVITE to the I/S-CSCF, wherein the re-INVITE carries information of a media socket entity.

The re-negotiation processing from the signaling control network element to the UE-A and the UE-B does not limit the order of the UE-A and the UE-B, and the processing may be performed not simultaneously or simultaneously.

In Step 1307, the I/S-CSCF forwards the re-INVITE to the SBC/P-CSCF.

In Step 1308, the SBC/P-CSCF forwards the re-INVITE to the UE-A.

In Step 1309, the UE-A executes the media path change, and forwards a media renegotiation answer response 200 OK to the SBC/P-CSCF, wherein the 200 OK carries the changed media information.

In Step 1310, the SBC/P-CSCF forwards the 200 OK to the I/S-CSCF.

In Step 1311, the I/S-CSCF forwards the 200 OK to the signaling control network element.

In Step 1312, the signaling control network element sends an acknowledgement message (ACK) to the I/S-CSCF, wherein the ACK represents a media renegotiation answer response has been received.

In Step 1313, the I/S-CSCF forwards the ACK to the SBC/P-CSCF.

In Step 1314, the SBC/P-CSCF forwards the ACK to the UE-A to complete the switching of the audio-video media path of the UE-A.

In Step 1315, the signaling control network element initiates a media path change request to the UE-B, and sends a re-INVITE to an I/S-CSCF, wherein the re-INVITE carries information of a media socket entity.

In Step 1316, the I/S-CSCF forwards the re-INVITE to the SBC/P-CSCF.

In Step 1317, the SBC/P-CSCF forwards the re-INVITE request to the UE-B.

In Step 1318, the multi-application terminal UE-B executes a media path change and forwards a media renegotiation answer response 200 OK to the SBC/P-CSCF, wherein the media renegotiation answer response 200 OK carries the changed media information.

In Step 1319, the SBC/P-CSCF forwards the media renegotiation answer response 200 OK to the I/S-CSCF.

In Step 1320, the I/S-CSCF forwards the media renegotiation answer response 200 OK to the signaling control network element.

In Step 1321, the signaling control network element sends an ACK to the I/S-CSCF to indicate the media renegotiation answer response has been received.

In Step 1322, the I/S-CSCF forwards the ACK to the SBC/P-CSCF.

In Step 1323, the SBC/P-CSCF forwards the ACK to the UE-B to complete the switching of the audio-video media path.

Then, the UE-A interacts with the application entity via the transparent data transmission channel to realize the change of an audio-video media path, and a specific service logic; after the audio-video media path is changed, both UE-A and UE-B can acquire data of the same application entity via the media processing network element, for example, in a conference scenario, UE-A and UE-B can acquire the same live video information from the application entity.

Figure 14:
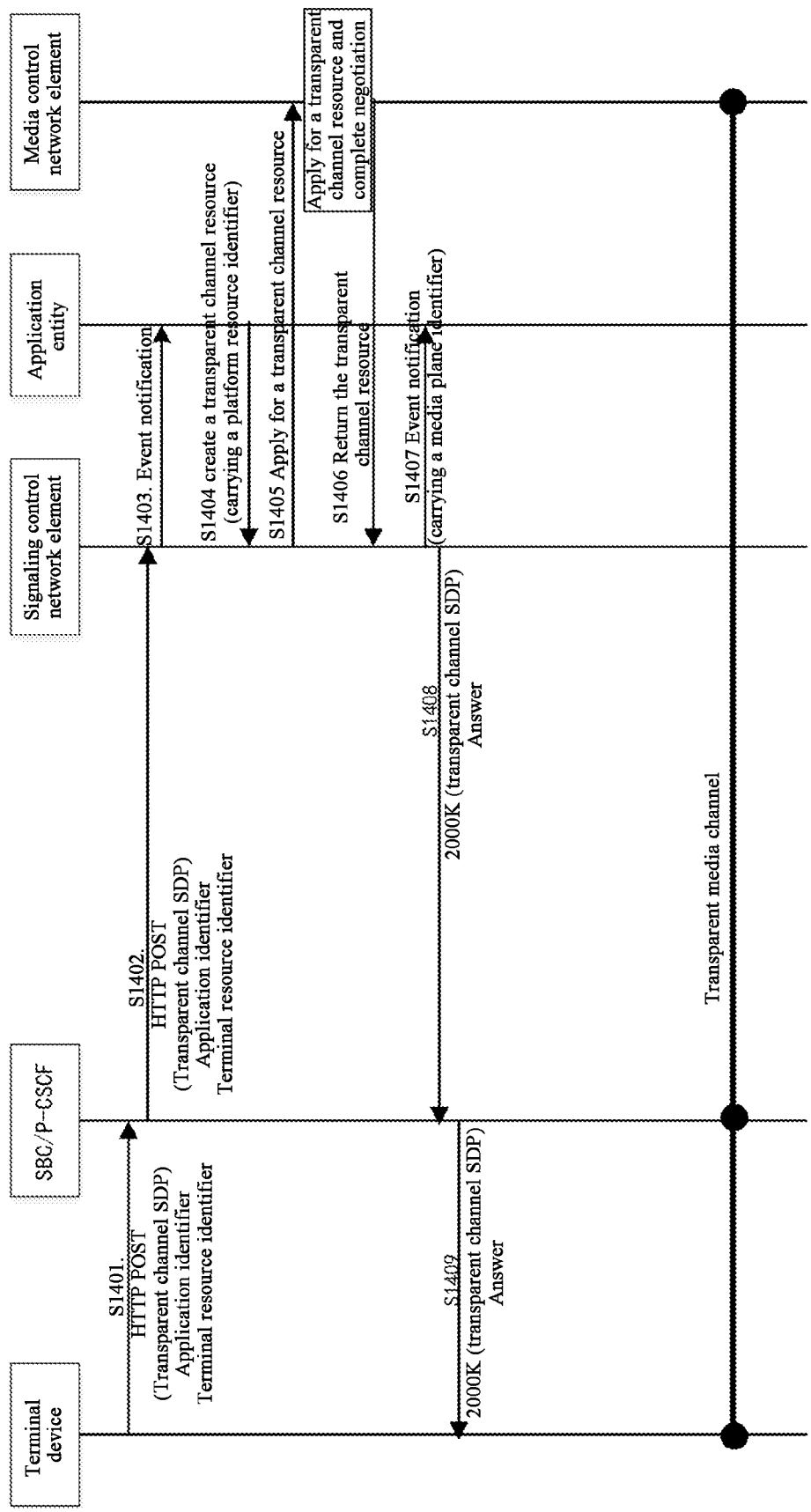
FIG. 14 is a flow chart for implementing multi-application communication by a terminal device using an HTTP protocol in a communication method of a communication system according to an embodiment of the present disclosure.

As shown in FIG. 14 which shows a flow chart illustrating a communication method according to another embodiment of the present disclosure. The communication method is applied to the overall system architecture of FIG. 1. The present embodiment is an embodiment in which the terminal device implements multi-application communication by using an HTTP protocol and describes a process of using the method according to the present disclosure to implement the multi-application communication using the HTTP protocol.

In Step 1401, a calling side terminal device sends a call request (HTTP POST) to an SBC/P-CSCF; a current session is designated in an HTTP message as a request for creating a transparent data channel; a media type identifier of the transparent data channel is indicated in a media line in the SDP description; since data of the transparent data channel needn't be sensed by an intermediate network element, the SDP carries information of the transparent data channel, comprising information such as an IP address and a port of a terminal side, an application protocol used in the transparent data channel, and a resource identifier of the present application at the terminal side.

In Step 1402, an SBC/P-CSCF applies for a forwarding resource of the transparent data channel, and modifies, in the SDP, an IP address and a port of a terminal device into an IP address and port of an SBC/P-CSCF network side, the content of other terminal devices in the SDP remaining unchanged and forwards an HTTP POST call request to a signaling control network element.

In Step 1403, a signaling control network element converts a call request into a call event and sends the same to an application entity, wherein the call event carries content such as an indication to create a transparent data channel and transparent data channel information.

In Step 1404, according to a processing logic of the application, the application entity indicates the signaling control network element to create a transparent data channel to realize application data exchange with the terminal device. The indication sent to the signaling control network element comprising a resource identifier of the application entity, wherein the identifier enables the terminal device to distinguish different application entities.

In Step 1405, the signaling control network element applies to the media control network element for a media resource according to the indication of the application entity.

It may be appreciated that the signaling control network element may also directly apply to the media socket entity for media without the indication of the application entity. This is not specifically limited in the present embodiment.

In Step 1406, the media control network element allocates a transparent data channel resource and returns resource information to the signaling control network element after negotiating with transparent data channel information of the terminal device.

In Step 1407, the signaling control network element sends a notification message to the application entity to notify that the transparent data channel has been created successfully and corresponding information of the transparent data channel.

In Step 1408, the signaling control network element returns an answer response (HTTP 200 OK) to the SBC/P-CSCF, wherein the HTTP 200 OK carries information of the transparent data channel and resource information of the application entity.

In Step 1409, the SBC/P-CSCF replaces an IP address and port in the application response with an IP address and port of the SBC/P-CSCF and then forwards the answer response to the terminal device.

Then the terminal device may communicate with the media control network element via the transparent data channel. The media control network element forwards data to the application entity, and the application data carries a resource identifier of the application entity, so that the application entity may distinguish different service requests. The application entity also sends application data to the terminal device via the transparent data channel of the media control network element, wherein a terminal resource identifier is contained in the application data, so that the terminal device may distinguish different service requests and realize different processing logics.

Figure 15:
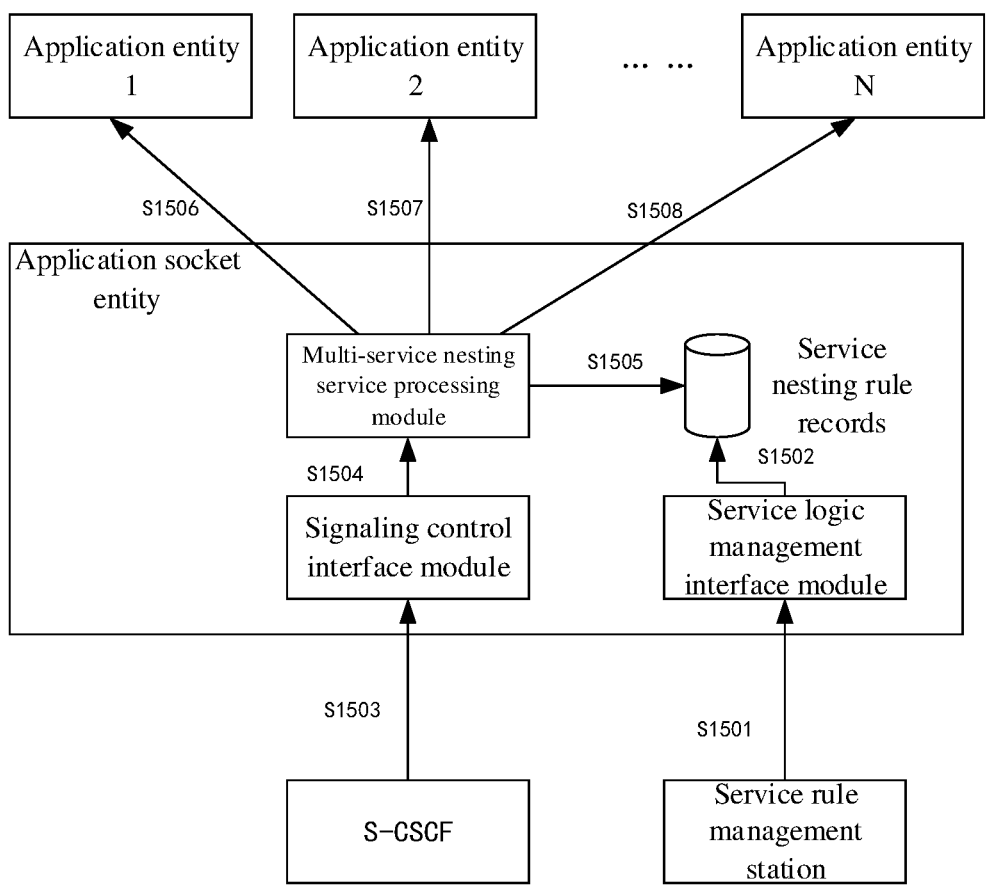
FIG. 15 is a flow chart of editable multi-application nesting in a communication method of a communication system provided by one embodiment of the present disclosure.

As shown in FIG. 15, which shows a flowchart of a communication method according to another embodiment of the present disclosure, the communication method is applied to the overall system architecture of FIG. 1. The present embodiment is an embodiment in which multi-application nesting is editable, and a process of editable multi-application nesting is achieved.

In Step 1501, a user invokes a service logic management interface module of a signaling control network element to edit a multi-application nesting logic via a service rule management platform, comprising, but not limited to, an order in which applications are triggered, conditions under which the applications are triggered, and principles of handling anomalies of applications.

In Step 1502, the service logic management interface module generates a nesting rule record according to a nesting rule input by the user and stores the nesting rule record in a file or a database.

In Step 1503, when the user initiates a service request, the corresponding service request is sent by an S-CSCF to a signaling control interface module in the signaling control network element; wherein the signaling control interface module is responsible for converting signaling requests of different external protocols (for example, SIP, HTTP, etc.) into an internal unified control instruction.

In Step 1504, the signaling control interface module in the signaling control network element sends a control instruction to a multi-service nesting processing module of the signaling control network element.

In Step 1505, the multi-service nesting processing module of the signaling control network element accesses a service nesting rule file or a database and reads a corresponding nesting rule record.

In Step 1506, the multi-service nesting processing module of the signaling control network element firstly sends a service request to an application entity 1 according to the nesting rule record.

In Step 1507, after completing the interaction with the application entity 1, the multi-service nesting processing module of the signaling control network element continues to send a service request to the application entity 2 according to the nesting rule record.

In Step 1508, after completing the interaction with the application entity 2, the multi-service nesting processing module continues to send a service request to the application entity N according to the nesting rule record until execution of all the services has been completed.

Based on the above-mentioned communication method, various embodiments of the signaling control network element, the media control network element, the communication system and the computer-readable storage medium of the present disclosure are presented below, respectively.

Figure 16:
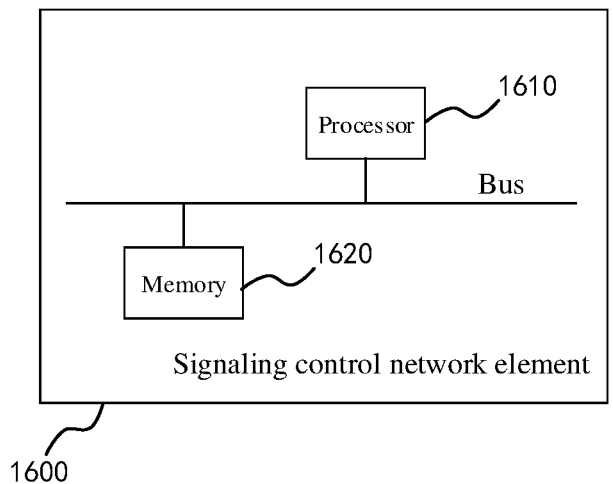
FIG. 16 is a schematic diagram of a signaling control network element according to one embodiment of the present disclosure.

An embodiment of the present disclosure further provides a signaling control network element. Referring to FIG. 16, a signaling control network element 1600 comprises a memory 1620, a processor 1610, and a computer program stored on the memory 1620 and operable on the processor 1610.

The processor 1610 and the memory 1620 may be connected by a bus or in other manners.

As a non-transitory computer-readable storage medium, the memory 1620 may be used to store a non-transitory software program as well as a non-transitory computer-executable program. In addition, the memory 1620 may include a high-speed random access memory and may also include a non-transitory memory such as at least one disk storage device, a flash memory device, or other non-transitory solid state storage device. In some embodiments, the memory 1620 may include a memory which is remotely located with respect to the processor and may be connected to the processor via a network. Examples of the above network include, but are not limited to, the Internet, intranets, local area networks, mobile communication networks, and combinations thereof.

The non-transitory software programs and instructions for implementing the communication method of the above-described embodiments are stored in the memory 1620 and, when executed by the processor 1610, perform the communication method of the above-described embodiments, for example, perform the above-described steps S100 to S400 of the method in FIG. 2, steps S310 to S330 of the method in FIG. 3, steps S410 to S420 of the method in FIG. 4, steps S510 to S530 of the method in FIG. 5, steps S610 to S620 of the method in FIG. 6, steps S710 to S720 of the method in FIG. 7, steps S810 to S820 of the method in FIG. 8, and steps S910 to S930 of the method in FIG. 9.

Figure 17:
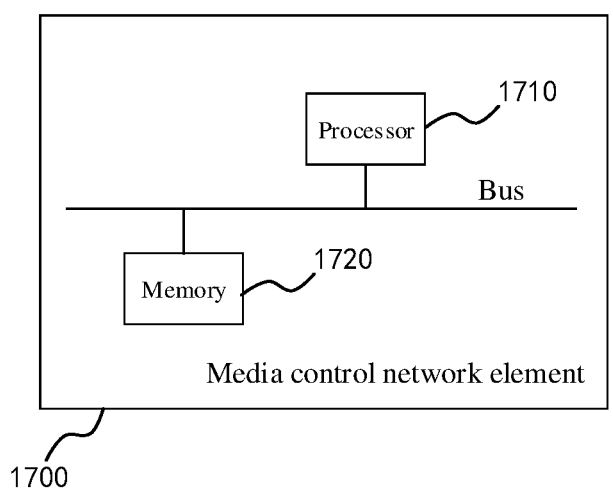
FIG. 17 is a schematic diagram of a media control network element according to one embodiment of the present disclosure.

An embodiment of the present disclosure further provides a media control network element. Referring to FIG. 17, a media control network element 1700 includes a memory 1720, a processor 1710, and a computer program stored on the memory 1720 and operable on the processor 1710.

The processor 1710 and the memory 1720 may be connected by a bus or in other manners.

As a non-transitory computer-readable storage medium, the memory 1720 may be used to store a non-transitory software program as well as a non-transitory computer-executable program. In addition, the memory 1720 may include a high-speed random access memory and may also include a non-transitory memory such as at least one disk storage device, a flash memory device, or other non-transitory solid state storage device. In some embodiments, the memory 1720 may include a memory which is remotely located with respect to the processor and may be connected to the processor via a network. Examples of the above network include, but are not limited to, the Internet, intranets, local area networks, mobile communication networks, and combinations thereof.

The non-transitory software programs and instructions for implementing the communication method of the above embodiments are stored in the memory 1720 and, when executed by the processor 1710, perform the communication method of the above-described embodiments, for example, perform the above-described steps S1010 to S1040 of the method in FIG. 10

An embodiment of the present disclosure further provides a communication system whose structure is the same as the system architecture of FIG. 1. The communication system is capable of implementing the communication methods of the above-mentioned embodiments, for example implementing the communication methods of FIG. 11 through FIG. 15 described above, for example implementing steps S1101 to S1114 of the method in FIG. 11, steps S1201 to S1214 of the method in FIG. 12, steps S1301 to S1323 of the method of FIG. 13, steps S1401 to S1409 of the method in FIG. 14 and steps S1501 to S1508 of the method in FIG. 15. The technical problems that can be solved and the technical effects that can be achieved are consistent with those in the above-mentioned embodiments and will not be described in detail here.

Furthermore, an embodiment of the present disclosure further provides a computer-readable storage medium storing computer-executable instructions which are executed by a processor or controller, e.g., by a processor in the communication apparatus in the above-described embodiments, and which cause the processor to execute the communication method in the above-described embodiments, e.g., to perform steps S100 to S200 of the method in FIG. 2, steps S310 to S320 of the method in FIG. 3, step S410 of the method in FIG. 4, steps S510 to S520 of the method in FIG. 5, steps S610 to S640 of the method in FIG. 6, steps S810 to S830 of the method in FIG. 8; or performing the steps S1010 to S1040 of the method in FIG. 10; or performing steps S1101 to S1114 of the method in FIG. 11, steps S1201 to S1214 of the method in FIG. 12, steps S1301 to S1323 of the method in FIG. 13, steps S1401 to S1409 of the method in FIG. 14, and steps S1501 to S1508 of the method in FIG. 15.

The embodiments of the present embodiments comprise: acquiring a transparent transmission channel creation request which carries a first terminal identifier, and then performing, according to the transparent transmission channel creation request, negotiation processing on a media control network element and a first terminal device corresponding to a first terminal identifier, so as to create the transparent transmission channel between the media control network element and the first terminal device; obtaining a first resource identifier of an application entity according to the transparent transmission channel creation request, and sending the first resource identifier to a media control network element, so that the media control network element determines a data transmission relationship between the transparent transmission channel and the application entity corresponding to an application identifier. Since the first terminal device can directly perform data transmission with the application entity through the transparent transmission channel, when a new application is developed, the existing system needn't be updated, which greatly improves the utilization rate of media resources and the expansion capability of the new media application.

It will be appreciated by one of ordinary skill in the art that all or some of the steps of the methods, and system in the preceding text may be implemented as software, firmware, hardware, and appropriate combinations thereof. Some, or all, of the physical components may be implemented as software executed by a processor, such as a central processing unit, digital signal processor, or microprocessor, or as hardware, or as an integrated circuit such as an application specific integrated circuit. Such software may be distributed on a computer-readable medium, which may include a computer storage medium (or non-transitory medium) and a communication medium (or transitory medium). As well known by those of ordinary skill in the art, the term computer storage medium includes volatile and nonvolatile, removable and non-removable media implemented in any method or technology for storage of information such as computer readable instructions, data structures, program modules or other data. The computer storage medium includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer. Moreover, as well known by those having ordinary skill in the art, the communication medium typically contains computer readable instructions, data structures, program modules or other data in a modulated data signal such as a carrier wave or other transport mechanism and may include any information delivery media.

Several embodiments of the present disclosure are described in detail above, but the present disclosure is not limited to the above embodiments. Those skilled in the art may make various equivalent variations and substitutions without departing from the spirit of the present disclosure, and these equivalent variations or substitutions are all included in the scope defined by the appended claims of the present disclosure.

The invention claimed is:

1. A communication method, implemented at a signaling control network element, the signaling control network element being communicatively connected to at least one terminal device via a Call Session Control Function CSCF, the signaling control network element being connected to a media control network element, the signaling control network element being connected to at least one application entity, the media control network element being connected to at least one application entity, wherein comprising:
   acquiring a transparent transmission channel creation request which carries a first terminal identifier;
   performing, according to the transparent transmission channel creation request, negotiation processing, on the media control network element and a first terminal device corresponding to the first terminal identifier, to create a transparent transmission channel between the media control network element and the first terminal device;
   obtaining a first resource identifier of a first application entity according to the transparent transmission channel creation request; and
   sending the first resource identifier to the media control network element such that the media control network element is able to determine a data transmission relationship between the transparent transmission channel and the first application entity corresponding to an application identifier;
   wherein when the transparent transmission channel creation request comes from the first application entity, the performing, according to the transparent transmission channel creation request, negotiation processing, on the media control network element and a first terminal device corresponding to the first terminal identifier, to create a transparent transmission channel between the media control network element and the first terminal device comprises:

sending a transparent transmission channel creation indication to the media control network element according to the transparent transmission channel creation request;

acquiring transparent transmission channel resource information from the media control network element; and sending a transparent transmission channel call request to the first terminal device corresponding to the first terminal identifier via the CSCF according to the transparent transmission channel resource information to create the transparent transmission channel between the media control network element and the first terminal device.

2. The communication method according to claim 1, further comprising:

acquiring a transparent transmission channel creation reply generated by the first terminal device according to the transparent transmission channel call request and sent by the CSCF, wherein the transparent transmission channel creation reply carries a first channel identifier corresponding to the transparent transmission channel and a second resource identifier corresponding to an application resource provided by the first terminal device; and sending the first channel identifier and the second resource identifier to the first application entity according to the transparent transmission channel creation reply.

3. The communication method according to claim 1, wherein when the transparent transmission channel creation request is sent by the first terminal device via the CSCF, the performing, according to the transparent transmission channel creation request, negotiation processing, on the media control network element and a first terminal device corresponding to the first terminal identifier, to create a transparent transmission channel between the media control network element and the first terminal device comprises:

sending a transparent transmission channel creation indication to the media control network element according to the transparent transmission channel creation request;

acquiring transparent transmission channel creation resource information from the media control network element; and sending information about successful creation of the transparent transmission channel to the first terminal device via the CSCF according to the transparent transmission channel resource information to create a transparent transmission channel between the media control network element and the first terminal device.

4. The communication method according to claim 3, wherein the transparent transmission channel creation request carries an application identifier, the obtaining a first resource identifier of the first application entity according to the transparent transmission channel creation request comprises:

sending a transparent transmission channel creation event notification to the first application entity corresponding to the application identifier according to the transparent transmission channel creation request; and acquiring a first resource identifier from the first application entity.

5. The communication method according to claim 4, further comprising:

acquiring a first channel identifier corresponding to the transparent transmission channel; and sending the first channel identifier to the first application entity.

6. The communication method according to claim 1, wherein the terminal device further comprises a second terminal device, the method further comprising:

acquiring a change request from the application entity, the change request characterizing changing a path of a first media channel;

sending a first media path change request to the first terminal device via the CSCF according to the change request;

sending a second media path change request to a second terminal device;

changing the first media channel to a second media channel; and passing the second media channel through the media control network element.

7. The communication method according to claim 1, wherein the first application entity comprises a plurality of application entities, the method further comprising:

acquiring a control instruction from the CSCF, the control instruction characterizing sending a service request to the plurality of application entities;

obtaining pre-set nesting rule information according to the control instruction; and sending the service request sequentially to different application entities in the plurality of application entities according to the nesting rule information until services corresponding to all the service requests are completed.

8. A non-transitory computer-readable storage medium having stored thereon computer-executable instructions, wherein the computer-executable instructions are used for performing the communication method according to claim 1.

9. A communication method implemented at a media control network element, the media control network element being connected to a signaling control network element, the media control network element being connected to at least one application entity, the signaling control network element being communicatively connected to at least one terminal device via a CSCF, the signaling control network element being connected to at least one application entity, comprising:

acquiring a transparent transmission channel resource request from the signaling control network element;

allocating transparent transmission channel resource information for establishing a transparent transmission channel according to the transparent transmission channel resource request;

sending the transparent transmission channel resource information to the signaling control network element to perform coordination processing on a first terminal device via the signaling control network element, thereby creating a transparent transmission channel between the media control network element and the first terminal device;

acquiring a first resource identifier from a signaling processing unit, wherein the first resource identifier is a resource identifier of a first application entity; and determining a data transmission relationship between the transparent transmission channel and the first application entity corresponding to the first resource identifier according to the first resource identifier.

10. A non-transitory computer-readable storage medium having stored thereon computer-executable instructions, wherein the computer-executable instructions are used for performing the communication method according to claim 9.

11. A media control network element, comprising: a memory, a processor and a computer program stored on the memory and executable on the processor, the processor performs the communication method according to claim 9 upon executing the computer program.

12. A signaling control network element, comprising: a memory, a processor, and a computer program stored on the memory and executable on the processor, the signaling control network element being communicatively connected to at least one terminal device via a Call Session Control Function CSCF, the signaling control network element being connected to at least one application entity, the signaling control network element being connected to at least one application entity, wherein the processor performing operations upon executing the computer program, wherein the operations include:
   acquiring a transparent transmission channel creation request which carries a first terminal identifier;
   performing, according to the transparent transmission channel creation request, negotiation processing with a media control network element and a first terminal device corresponding to the first terminal identifier, to create a transparent transmission channel between the media control network element and the first terminal device;
   obtaining a first resource identifier of a first application entity according to the transparent transmission channel creation request;
   sending the first resource identifier to the media control network element such that a media control network element determines a data transmission relationship between the transparent transmission channel and the first application entity corresponding to an application identifier,
   wherein when the transparent transmission channel creation request comes from the application entity, the performing, according to the transparent transmission channel creation request, negotiation processing, on the media control network element and a first terminal device corresponding to the first terminal identifier, to create a transparent transmission channel between the media control network element and the first terminal device comprises:
   sending a transparent transmission channel creation indication to the media control network element according to the transparent transmission channel creation request;
   acquiring transparent transmission channel resource information from the media control network element;
   sending a transparent transmission channel call request to the first terminal device corresponding to the first terminal identifier via the CSCF according to the transparent transmission channel resource information to create the transparent transmission channel between the media control network element and the first terminal device.

13. The signaling control network element according to claim 12, wherein the operations further comprising:
   acquiring a transparent transmission channel creation reply generated by the first terminal device according to the transparent transmission channel call request and sent by the CSCF, wherein the transparent transmission channel creation reply carries a first channel identifier corresponding to the transparent transmission channel and a second resource identifier corresponding to an application resource provided by the first terminal device; and
   sending the first channel identifier and the second resource identifier to the first application entity according to the transparent transmission channel creation reply.

14. The signaling control network element according to claim 12, wherein when the transparent transmission channel creation request is sent by the first terminal device via the CSCF, the performing, according to the transparent transmission channel creation request, negotiation processing, on the media control network element and a first terminal device corresponding to the first terminal identifier, to create a transparent transmission channel between the media control network element and the first terminal device comprises:
   sending a transparent transmission channel creation indication to the media control network element according to the transparent transmission channel creation request;
   acquiring transparent transmission channel creation resource information from the media control network element; and
   sending information about successful creation of the transparent transmission channel to the first terminal device via the CSCF according to the transparent transmission channel resource information to create a transparent transmission channel between the media control network element and the first terminal device.

15. The signaling control network element according to claim 14, wherein the transparent transmission channel creation request carries an application identifier, the obtaining a first resource identifier of the application entity according to the transparent transmission channel creation request comprises:
   sending a transparent transmission channel creation event notification to the first application entity corresponding to the application identifier according to the transparent transmission channel creation request; and
   acquiring a first resource identifier from the first application entity.

16. The signaling control network element according to claim 15, wherein the operations further comprising:
   acquiring a first channel identifier corresponding to the transparent transmission channel; and
   sending the first channel identifier to the first application entity.

17. The signaling control network element according to claim 12, wherein the terminal device further comprises a second terminal device, the operations further comprising:
   acquiring a change request from the application entity, the change request characterizing changing a path of a first media channel;
   sending a first media path change request to the first terminal device via the CSCF according to the change request; and
   sending a second media path change request to a second terminal device, so that the first media channel is changed to a second media channel and the second media channel passes through the media control network element.

* * * * *